Aug. 13, 1957  W. H. ALBEE  2,802,541
VEHICLE COMPRISING A FLEXIBLE-WALLED, FLUID-CONTAINING ROLLER
Filed May 17, 1954  5 Sheets-Sheet 1
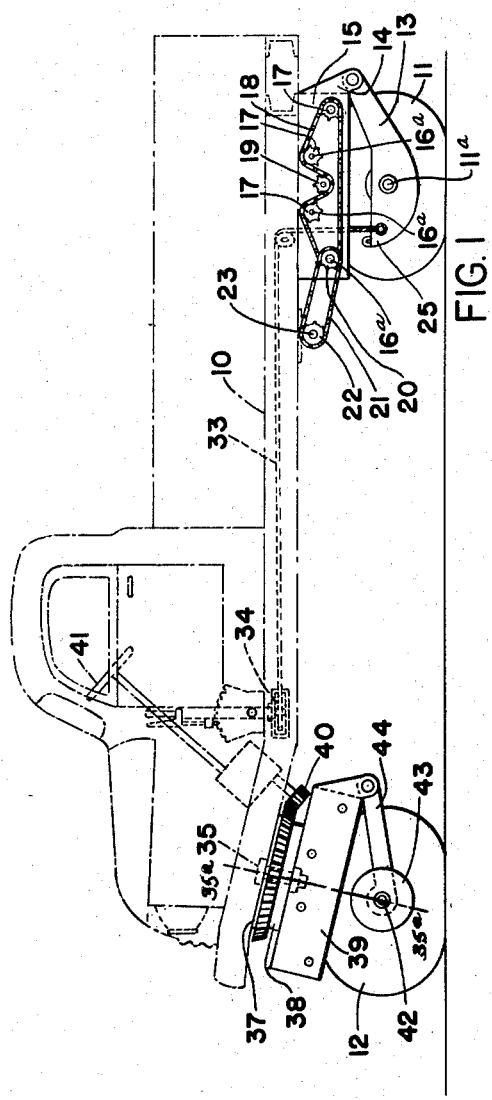
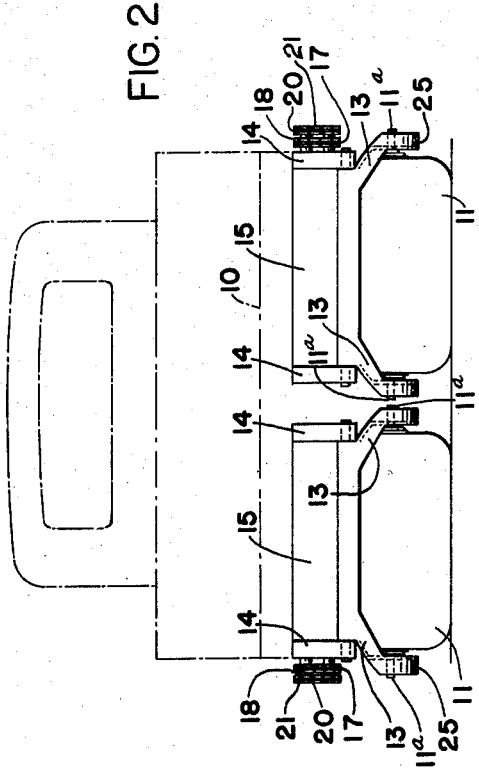
INVENTOR.
WILLIAM H. ALBEE
BY Willard D. Eakin
ATTORNEY

INVENTOR.
WILLIAM H. ALBEE
BY
ATTORNEY

Aug. 13, 1957　　　W. H. ALBEE　　　2,802,541
VEHICLE COMPRISING A FLEXIBLE-WALLED, FLUID-CONTAINING ROLLER
Filed May 17, 1954　　　5 Sheets-Sheet 3

INVENTOR.
WILLIAM H. ALBEE
BY Willard D. Eakin
ATTORNEY

Aug. 13, 1957 W. H. ALBEE 2,802,541
VEHICLE COMPRISING A FLEXIBLE-WALLED, FLUID-CONTAINING ROLLER
Filed May 17, 1954 5 Sheets-Sheet 4
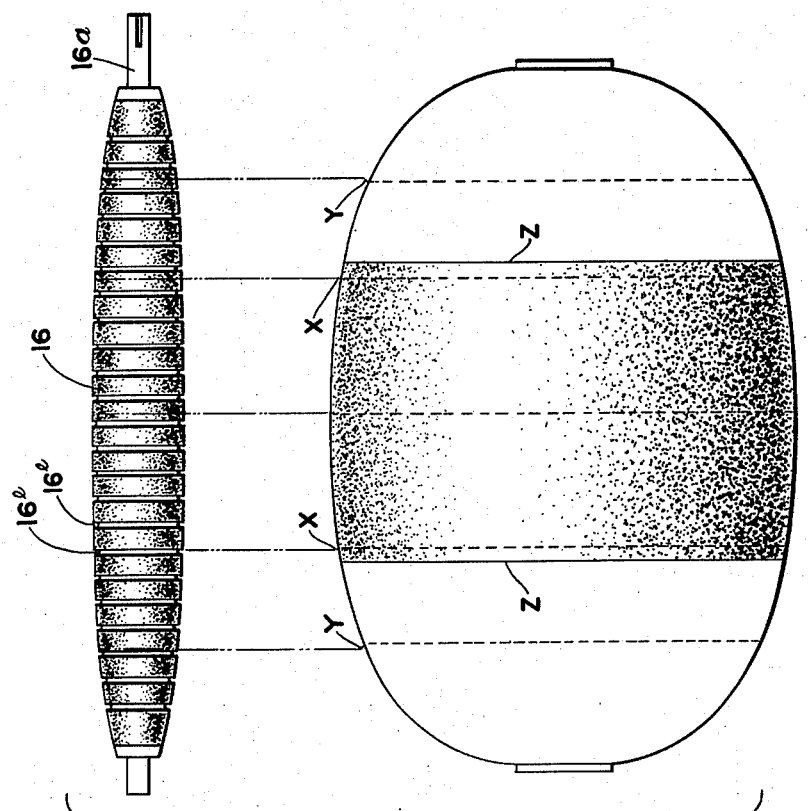
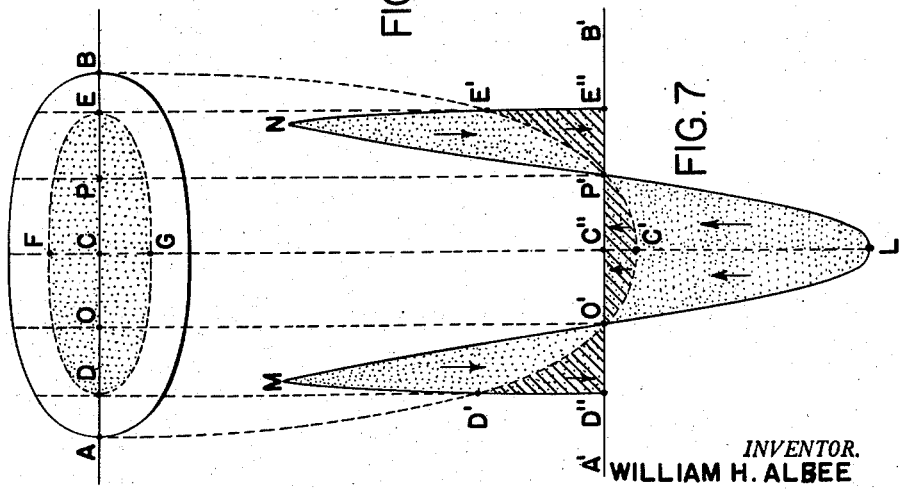
INVENTOR.
WILLIAM H. ALBEE
BY Willard D. Eakin
ATTORNEY Aug. 13, 1957 W. H. ALBEE 2,802,541
VEHICLE COMPRISING A FLEXIBLE-WALLED, FLUID-CONTAINING ROLLER
Filed May 17, 1954 5 Sheets-Sheet 5

INVENTOR.
WILLIAM H. ALBEE
BY
*Willard D. Eakin*
ATTORNEY

United States Patent Office 2,802,541
Patented Aug. 13, 1957

2,802,541

VEHICLE COMPRISING A FLEXIBLE-WALLED, FLUID-CONTAINING ROLLER

William H. Albee, Carmel, Calif.

Application May 17, 1954, Serial No. 430,179

22 Claims. (Cl. 180—74)

This invention relates to a vehicle comprising a flexible-walled, fluid-distensible roller, and especially a peripherally-loaded roller.

Some of the features described in the present application are described also, and more broadly claimed, in my copending application, Serial No. 265,296, filed January 7, 1952, upon which U. S. Patent No. 2,714,011 issued July 26, 1955, and which has since reissued as Patent No. Re. 24,272 date February 12, 1957.

The chief objects of the present invention are to provide in an improved manner for steering of the vehicle; to provide, in a self-propelled vehicle of the type referred to, driving means subject to comparatively low frictional loss of power; to provide stronger frictional driving of such a vehicle; and to provide against damage to the roller or rollers under extreme conditions such, for example, as a condition of high overload or rough terrain, or both.

More detailed objects will be manifest.

Of the accompanying drawings:

Fig. 1 is a side elevation of a vehicle of the truck type embodying the invention in its preferred form.

Fig. 2 is a rear elevation of the same.

Fig. 6 is an elevation of roller elements presented in diagrammatic relation to each other.

Fig. 7 is a diagram of slippage and frictional factors involved in the operation of the lower one of the rollers shown in Fig. 6.

Figure 3:
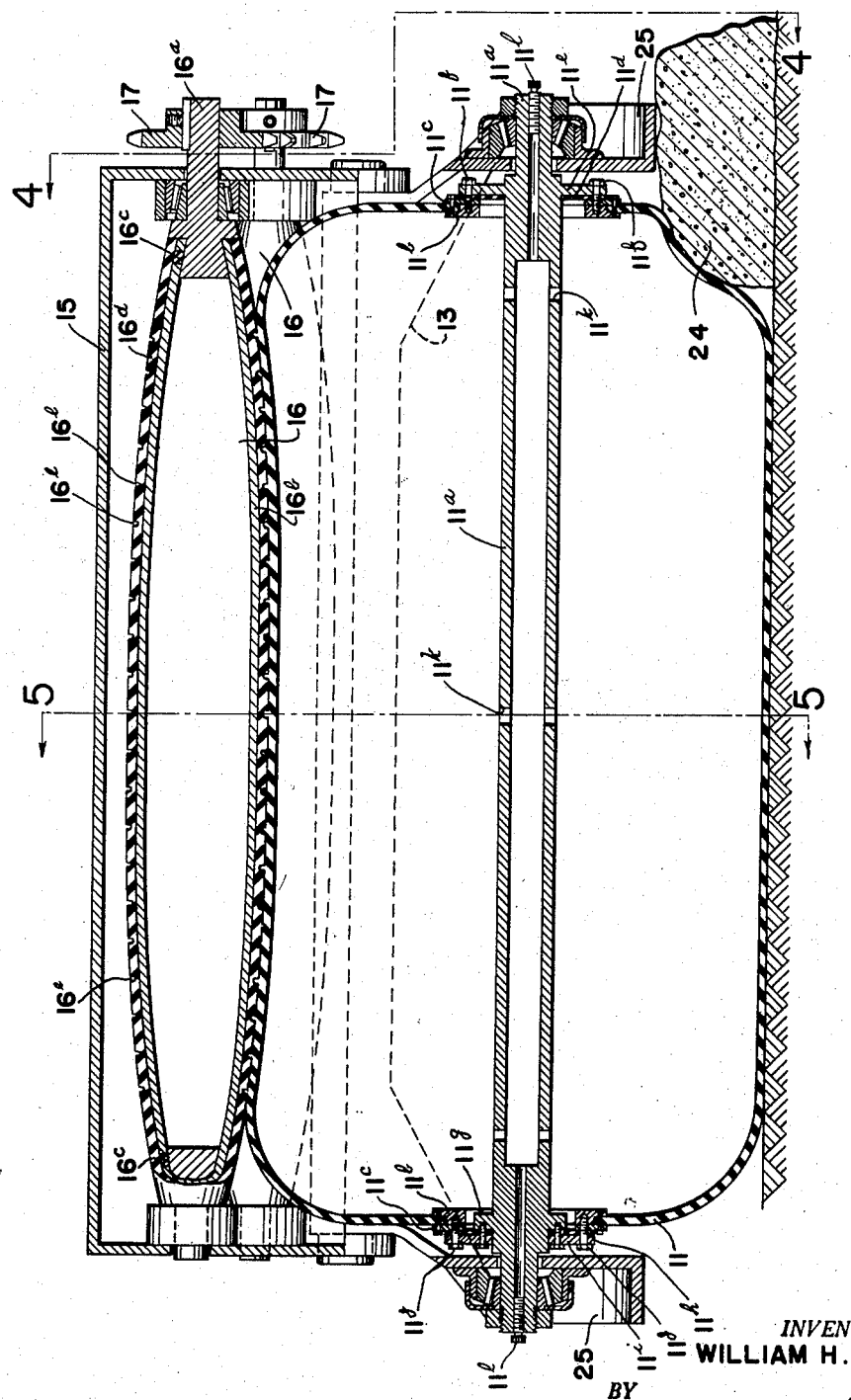
Fig. 3 is a section on line 3—3 of Fig. 4, on a relatively large scale.

The particular vehicle here shown comprises a truck frame 10 having secured to its rear portion supporting-and-propelling means comprising a pair of peripherally-driven fluid-distensible rollers or "bags" 11, 11 and to its front portion supporting-and-steering means comprising a fluid-distensible roller or "bag" 12 which is not necessarily provided with peripheral drive means. The bags 11 and 12 preferably are of cord-reinforced rubber, built and vulcanized in their crowned shape.

The peripherally-driven rollers 11, 11 at the rear of the vehicle have respective axles 11ª, 11ª journaled in the arms of respective yokes 13, 13 which, by means of trunnions integral with them, are hinged in respective pairs of brackets 14, 14, each pair of brackets being integral with and projecting downwardly and rearwardly from an inverted-box journal frame 15 which is secured to the under side of the truck frame 10 and surrounds the upper portion of the respective fluid-distensible roller 11.

Figure 4:
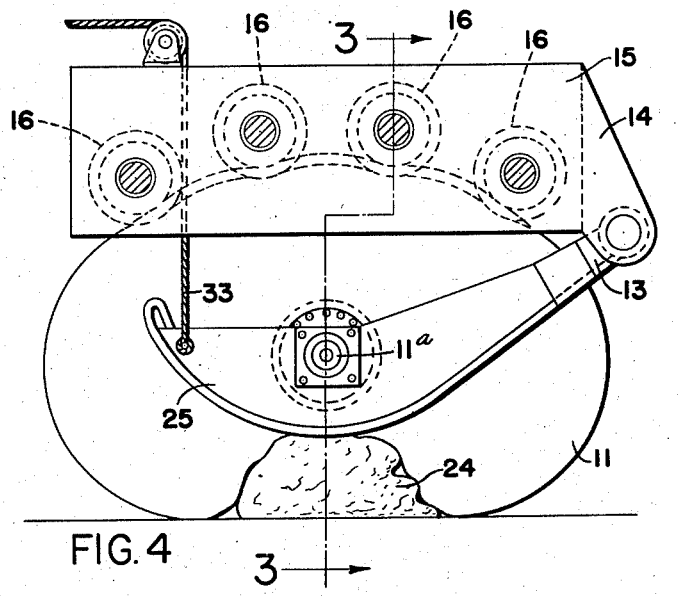
Fig. 4 is a side elevation of a rear portion of the vehicle shown in Fig. 1, with parts sectioned on line 4—4 of Fig. 3.
Figure 5:
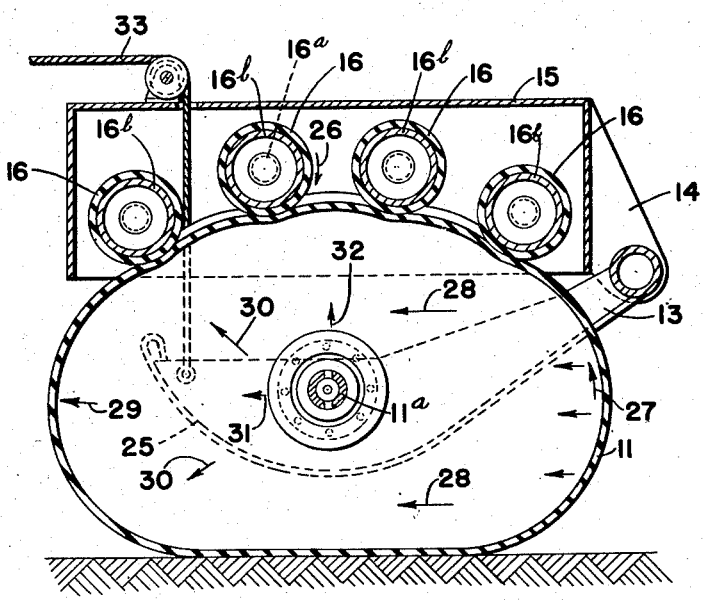
Fig. 5 is a section on line 5—5 of Fig. 3.

In each of the journal frames 15 an arcuately arranged set of circumferentially spaced load-applying or "saddle" rolls 16, 16 have their axes parallel with the axle 11ª of the associated fluid-distensible roller 11 and are journaled at their ends in the side walls of the journal frame, their positions being such that they sustain approximately equal parts of the load that is sustained by the associated fluid-distensible roller 11, as is clearly presented in Figs. 4 and 5.

At the sides of the vehicle the adjacent trunnions, 16ª, 16ª, of the saddle rolls 16 project past their bearings and outward from the journal frame and have respective sprockets 17, 17 secured upon them. Each set of sprockets 17 is surrounded by a sprocket chain 18 meshesd with them and with an idler sprocket 19 (Fig. 1) which is so positioned as to maintain a desirably large arc of engagement of the chain with the two adjacent sprockets 17. The idler sprocket 19 is mounted upon a stub shaft projecting from the journal frame or permissibly from a chain-tightener slide (not shown) suitably mounted upon the side of the journal frame.

As to each of the two sets of saddle rolls, the saddle-roll trunnion 16ª which has the foremost sprocket 17 secured upon it has a second sprocket, 20, Figs. 1 and 2, secured upon it and connected by a drive chain 21 with a sprocket 22 which is secured upon the end of an axle 23 driven, by the usual means (not shown) from the motor of the vehicle, and preferably through the usual differential gear (not shown).

The structure as described is such that driving of the sprockets 23 clockwise as viewed in Fig. 1 rotates the bags 11 counterclockwise and thus propels the vehicle forward, and reversal of the drive, of course, drives the vehicle backward.

An important feature of the present invention is that, for load-applying and peripheral-drive association with the crowned fluid-distensible rollers 11, each of the saddle rolls 16 is of crowned form and preferably of such determinately crowned form in relation to that of the fluid-distensible roller 11 that at each position lengthwise of the two rotary members their mutually contacting faces can have the same linear speed, so that the saddle rolls can peripherally drive the fluid-distensible roller without slippage, at any part of their contacting areas, in contrast to the slippage that is compelled by the crowned form of the fluid-distensible roller in the case of the cylindrical saddle rolls of my aforementioned copending application and in the case of the rolling of the crowned fluid-distensible roller in contact with the ground, as will be hereinafter discussed.

The proper crowning of the saddle roll is such that the perimeters of the two rotary members will be in the same ratio at all positions axially along their area of peripheral-drive contact, except that allowance should be made for the fact that when, as in the preferred embodiment, the saddle rolls are numerous and are circumferentially quite small in relation to the fluid-distensible roller, the indentation of the latter by each saddle roll is, in longitudinal section, preferably not so deep as to prevent endward migration of cross-sectional peripheries of the roller wall, such migration being progressively greater from the middle toward the ends of the fluid-distensible roller, as represented by the unequal offsets $x$, $x$ and $y$, $y$ in the vertical dotted lines in Fig. 6.

The importance of having the constant ratio of cross-sectional perimeters becomes manifest when it is appreciated that in the case of a 1 to 5 ratio (approximately that of Fig. 6) an error of $\frac{1}{32}$ inch in the radius of the saddle roll at a given position would result in a compelled slippage of approximately an inch in each revolution of the fluid-distensible roller.

The above mentioned ground-contact slippage or saddle-roll slippage in the case of cylindrical saddle rolls, that is compelled by the crowned shape of the fluid-distensible roller 11, is analyzed in the diagram that is Fig. 7, which also will be referred to again hereinafter in the matter of steering.

There a spheroidal bag, having the axis of rotation A—B, is represented in outline, as viewed from above, by the full-line elliptical figure, and its straight travel ground-contact area is represented by dotted elliptical figure with axes D—E and F—G, within and symmetrical with relation to the full-line figure, such that the major axis D—E lies within a longitudinal vertical section through the axis A—B, and the minor axis F—G lies within the center cross section of the roller, with the point C as the intersection of the axes D—E and F—G.

Suppose the distance C—C' is laid out at right angles to D—E and equal in length to the cross-sectional circumference or periphery of the bag at C, the distances D—D' and E—E' equal to the cross-sectional periphery at D and E repectively, and corresponding distances laid out for the cross-sectional periphery at each point along the axis D—E, then a symmetrically curved line D'—C'—E' will be generated representing the theoretical distance to which each separate point on the line D—E would travel in one complete revolution of the bag, providing each separate peripheral line could rotate independent of any other.

The construction of the bag, however, compells all peripheral lines or zones to rotate simultaneously. When the bag is rotated forward in straight travel one complete revolution, the axis A—B will progress to an average distance A'—B' and the axis D—C—E of the ground contact area will progress to a corresponding ground position D"—C"—E", and will remain a straight line which will intersect the curve D'—C'—E' at ground points O' and P'.

Therefore, in one complete revolution of the bag, a point on its surface at C, instead of progressing to a ground point C', is compelled to slip backward to C", and bag surface points D and E, instead of progressing to ground points D' and E', are compelled to slip forward to ground points D" and E", whereas bag surface points O and P progress without slippage to ground points O' and P'.

Thus the shaded areas D'OD" and E'P'E" represent the graduated slippage forward required of the lines D—O and P—E respectively, and the shaped area O'C"P'C' represents the graduated backward slippage required of the line O—C—P. These shaded areas are slippage factors for the complete line D—E.

The slippage factors for the ground contact area DFEGD may be represented by integrating said elliptical ground contact area with the slippage factors for the line D—E, thus producing the forward slippage factors represented by the areas D"MO'D" and P'NE"P', equal to each other, and the central, backward slippage factor represented by area O'LP'O', assuming the same coefficient of friction throughout the surface of the bag.

These compelled-slippage factors represented loss of power which loss, as to the saddle rolls, is substantially eliminated by the substitution of the crowned saddle rolls of the present application for the cylindrical saddle rolls of my above mentioned earlier application.

Because of that, the saddle rolls can very well be rough-surfaced throughout their length, as indicated by stippling in Fig. 6, for good frictional driving engagement with the bag under very heavy loading as well as light loading of the vehicle.

In fact, the substantial elimination of the "compelled slippage" makes it possible, without excessive wear of the rubber bag surface, to employ for the saddle roller an abrasive surface such as would quickly wear a relatively slipping, contacting rubber surface, but will not rapidly wear the rubber in the simple rolling contact of the properly crowned saddle roller.

In the case of the drive contact of the bag with the ground, however, there are considerations in favor of giving the bag a rough surface only in its middle region, as indicated in Fig. 6 by the stippling in the area between the full lines z, z, and giving the bag a smooth, easily slipping surface from each line z to the adjacent end of the bag.

These considerations involve the fact that the force for compelling the form-compelled forward slippage represented by the areas D"MO'D" and P'NE"P' is equal and opposite to the force for compelling the form-compelled rearward slippage represented by the area O'LP'O', the term "form-compelled" being used to distinguish from any slippage resulting simply from "draw-bar pull."

By having the end zones of the bag smooth and its middle zone rough, as in Fig. 6, the points of no-slippage, O' and P', can be caused to be closer together, which means that the power loss represented by the area O'LP'O' will be reduced and that the equal power loss represented by the two side areas will be likewise reduced, by their lower coefficient of friction, in spite of the fact that those areas become larger.

Further, such gain of efficiency, to be had by narrowing the rough zone between the lines z, z, of Fig. 6, is limited only by the necessity of avoiding such reduction of the area O'LP'O', with a given coefficient of friction therein, as would result in slippage being caused by "draw-bar pull," that term being considered as including gravity resistance in the case of a vehicle climbing an incline.

Details of construction of the elements above described can of course be varied, but in the specific construction here shown (Fig. 3) each saddle roll 16 comprises a shell-like hollow sheet-metal body $16^b$ dovetailed upon and plug-welded at $16^c$, $16^c$ to suitably formed inner end portions of the roll's end trunnions, as clearly shown in Fig. 3.

The metal roll-body shell $16^b$ has mold-vulcanized upon it and thus adhered to it a surface layer $16^d$ of suitable material, which can be formed with circumferential grooves $16^e$, $16^e$ and such other non-slip tread characteristics as may be found desirable.

Since, as above stated, the proper crowning of the saddle roll permits it to have an abrasive surface, the tread layer $16^d$, not required to be resilient, can be a stiff, frictional material such as brake lining or a mixture of coarse emery powder and a plastic, such as a formaldehyde condensation product, sufficiently hard to continue to retain the abrasive particles, as distinguished from deformable material such as vulcanized soft-rubber, subject to deformation and consequent quick loss of the abrasive particles in use. While such a matrix for the abrasive particles should be hard, as stated, it could be less hard than the abrasive particles, so as to wear faster and thus maintain always a field of projecting abrasive particles.

Each bag 11, as there shown, has at each end a central hole and each hole-defining margin of the bag is embraced between, and preferably vulcanized to, a pair of clamping rings $11^b$, $11^c$. At the right end of the bag the opening through the clamping rings is closed by a gasket $11^d$ and a flange $11^e$ integrally formed upon the bag's axle $11^a$. The gasket $11^d$ and flange $11^e$ are of such size as to overlap upon the clamping rings $11^b$, $11^c$ and to be clamped together with them by bolts $11^f$, $11^f$.

At the left end of the bag the axle $11^a$ is formed with a flange $11^g$ of small enough outer diameter to be passed through the rings $11^b$, $11^c$ at the right end of the bag in the assembling of the parts. Escape of air from the left end of the bag, between the clamping rings and the flange $11^g$, is prevented by a gasket $11^h$, annular clamping plate $11^i$ and clamping bolts $11^j$.

For conducting distending fluid into or out of the bag the axle $11^a$ is hollow, has its wall formed with air holes $11^k$, $11^k$, and is provided at each of its ends with a check-valve inflating stem $11^l$.

A major advantage of the type of locomotion provided by this type of vehicle is the ability of such a vehicle to travel over rough terrain. However, as illustrated in Fig. 3, if the end of a bag rolls over an obstruction such as a rock 24, serious damage to the bag may be caused at the juncture between the bag and its hub structure. Similar damage may also occur when the unit tilts far enough to one side to allow the hub of the bag to drag on the ground. To protect the hub area of the bag, the yoke arms 13 may be shaped so as to extend forward and downward to form a skid 25 which will slide over the obstruction or along the ground, as the case may be, thus protecting the bag around the hub area. Skids or other hub-protecting devices such as the wheels hereinafter described, with suitable stops, can protect the bag also in case of deflation, under inflation or over-load. A further advantage of the said devices as shown and described is that in the case of excessive lateral tilting of the vehicle, the skid 25, wheel 43 or the like that is on the side toward which the vehicle is tilted serves as guard means to limit such tilting by coming into contact with the ground, with only moderate tilting in the case of a much under-inflated or much overloaded roller 11 or 12. The device thus functions somewhat in the manner of an outrigger, limiting the tilting of the axis of the roller 11 or 12, and, through the hereinafter discussed stabilizing or symmetry-maintaining effect of the yoke structure, likewise stopping the lateral tilting of the vehicle frame.

An analysis of forces involved in forward driving of the vehicle is as follows: As indicated by the arrow 26, a torque force imparted by the saddle rolls tangentially to the load-bearing surface of the bag will pull fabric under tension 27 around the fluid mass, causing the fluid to move forward as indicated by arrows 28, 28, thereby transmitting pressure 29 against the front area of the bag, and through tensions 30, 30 in the fabric a forward force 31 is applied to the axle.

When the force 31 is applied to the axle, it not only results in a forward force being transmitted to the yoke and thus to the truck frame but also, because the axle is lower than the yoke's trunnions, urges the yoke arms to swing upward, as indicated by arrow 32, thereby increasing the total pressure between the load-bearing surface of the bag and the saddle rollers.

This upward force, developed automatically during forward movement of the unit as a result of the forward-pointing, inclined position of the yoke, is of great value because it increases considerably the total area of contact, and hence the total traction, between the saddle rollers and the bag, thereby increasing the total amount of force which may be transmitted between the saddle rollers and the bag.

The increase in the total amount of pressure between the saddle rollers and the bag, due to the upward urging of the yoke arms, may be compared to the increase in pressure developed between one's foot and his insole when one pulls upward on his bootstraps.

An additional upward force on the bag axle, and thus an increase in the total area and total pressure between the load-bearing surface of the bag and the saddle rollers, may be applied at the will of the operator by means of such a device as a cable 33 attached to a yoke arm and passing over pulleys, including a hand-lever pulley 34, and to a yoke arm at the other side of the vehicle. Such a relative pressing of the bag against its saddle rollers, by means of the cable 33, can be especially desirable in the backward driving of the vehicle, in which the yoke arms do not provide the boot-strap effect.

At the front end of the vehicle its frame 10 has pivotally mounted under it, by means of a king-pin 35 and "fifth-wheel" plates 37, 38, a journal frame 39 generally similar to the inverted-box frames 15 at the rear of the vehicle, the upper plate 37 being secured to the vehicle frame and the lower plate 38 being secured to the journal frame 39 and peripherally formed with bevel-gear teeth for turning the frame about the king-pin's axis $35^a$, $35^a$ by a bevel pinion 40 suitably mounted and rotated by a steering-wheel 41.

In the inverted-box 39 are freely journaled a set of saddle rolls corresponding substantially to the sets at the rear of the vehicle except for their not being driven. They rest upon the bag 12, mentioned above as a part of the supporting and steering means for the front end of the vehicle, and the bag has an axle 42 corresponding in general to the rear axles $11^a$. The yoke for the axle of this bag 12, and its mounting, correspond in general to the other yokes except for some differences that will be hereinafter discussed.

The outstanding feature of this supporting and steering assembly is that the turning axis of the journal frame 39, lying in the middle, vertical, fore-and-aft plane of the vehicle, leans backward, its upper end being rearward of its lower end.

Because of this oblique position of the journal frames axis, turning of the unit to right or left not only changes the orientation of the bag, as in the usual steering of a vehicle in a curved course, but also forcibly lowers the end of the bag that is at the inner side of the curved course and forcibly raises the other end of the bag, at the outer side of the curved course.

Figure 8:
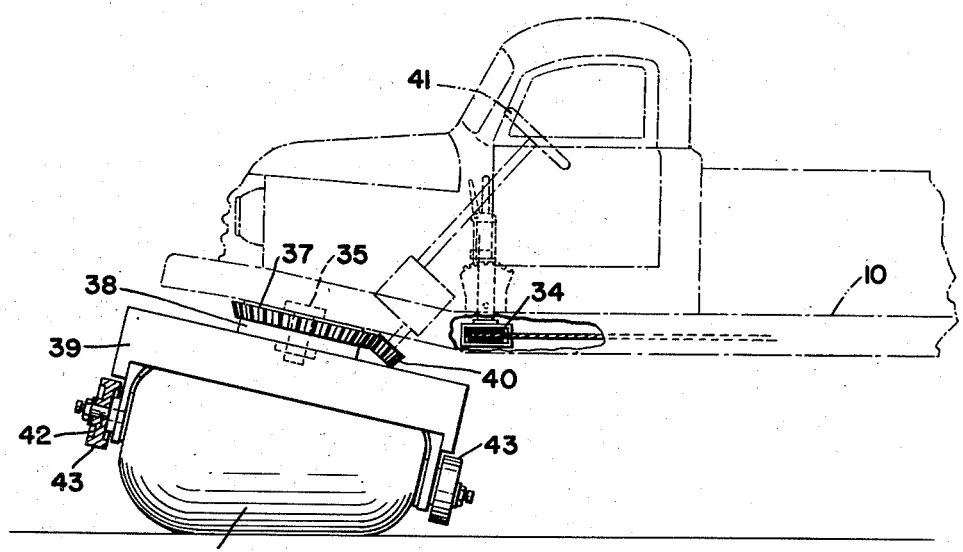
Fig. 8 is a side elevation of a front portion of the vehicle shown in Fig. 1, with steering means turned to an extreme position for clarity of illustration.

This effect, purely for illustration and not for actual operation of a vehicle driven by the rear bags 11, is shown, with the extreme 90 degree change of orientation, in Fig. 8.

Such forcible tilting of the bag laterally of the vehicle has the effect, through the continued parallelism of the "fifth-wheel" plates, of shifting the bag's center of load, with respect to the saddle rolls and with respect to the ground, toward the depressed end of the roller.

In spite of the deformation of cross-sectional perimeters of the bag, this causes the bag to have the directional characteristic of a conical roller. This may be made more clear by referring to the Fig. 7 diagram and noting that the lateral tilting of the bag will shift the no-slippage points O' and P' both in the same direction. Assuming that they are both shifted to the right as viewed in the diagram, Fig. 7, the no-slip point P' will progress toward smaller-perimeter parts of the bag and the no-slip point O' toward larger-perimeter parts of the bag. Since they are no-slip points, the larger-perimeter part of the bag at O' will travel over the ground faster than the smaller-perimeter part of the bag at P'.

The cone roller effect lessens the sum total of ground slippage or creepage incident to steering.

Figs. 1 and 8 have been employed also for showing the use of wheels 43, 43 as guard means for the bag. Each axle end or trunnion of the bag, journaled in one of the arms 44 of the yoke, projects outward beyond its bearing therein and has one of the wheels 43 journaled upon it. In case this front bag assembly is non-propelling, as here contemplated, there is no need of increasing the pressure between the bag and its saddle rolls.

The mode of operation of the vehicle and the interaction of its parts is believed to have been adequately brought out in the foregoing description.

Partial filling of each bag with a liquid may be desirable for increase of traction or for submergence in water.

The crowned form of the bags is important as to all of them not only because of providing for relatively easy change of their orientations, and providing the cone roller effect as to the front bag, but also in the matter of transmitting propulsion forces, from the middle region of the front wall of the bag to its end regions in the case of the driving rear bags, and from the end regions of the pushed front bag to the middle region of its rear wall. Stating the matter another way, the crowned bag, as an air-trussed beam, is more effectively trussed against over-all bending than a cylindrical bag of like volume.

Both of the types of propulsion forces just discussed are contemplated in the use of the words horizonal-propulsion means in the appended claims, the bag propelling the vehicle in one instance and the vehicle propelling the bag in the other instance, as in the case of a towed vehicle, or the pushed front-bag assembly of the present embodiment.

As clearly shown in Fig. 2 as to the rear yokes 13, 13, each of the yokes is of strong construction, the arms being integral with the transverse base element that connects them, so that the axis of the fluid-distensible roller is compelled by the yoke to maintain substantially parallel relation to and fore-and-aft alignment with the axes of the saddle rollers at all times, in spite of varying positions, laterally of the vehicle, of roadway obstructions or projections, and, as to the front ground-contacting roller, in spite of the turning of that roller on an oblique axis as above described for steering.

The yokes thus serve to maintain substantially constant symmetrical relationship of the axes of the saddle rolls to the axis of the ground-contacting roller, and, consequently, substantially constant distribution of the saddle-rolls' pressure and driving force against the ground-contacting roller, even though the vertical center line of the supporting force of ground contact shifts lengthwise of the axis of the ground-contacting roller, with the said axis becoming oblique to the said vertical center line because of lateral tilting of the vehicle, or, in the case of the front ground-contacting roller, because of tilting of the ground-contacting roller's axis for steering, and with the axis of the ground-contacting roller free to move toward and from the saddle rolls in operation.

In the appended claims such language as "entire weight of a transportation load" is intended to refer to the loading of the individual roller and not to the weight of the entire vehicle or the weight of its entire load.

I claim:

1. A vehicle comprising a flexible-walled, fluid-distensible roller adapted to be load-flattened against the ground throughout a part of the surface of the roller that is at least substantially as extensive axially as circumferentially of the roller, a load-sustaining structure and revolvable means journaled thereon and running upon the outer surface of said roller for applying substantially the entire weight of a transportation load to the roller, means having reaction against said structure for driving said revolvable means, means having reaction against said structure and comprising journal means for said roller for compelling said roller and said structure to progress at substantially the same ground speed, and means having reaction against said structure for exerting between said revolvable means and said roller a force additional to that of said load.

2. A vehicle as defined in claim 1 in which the defined means for compelling the roller and the structure to progress at substantially the same ground speed comprises link means hinged on the defined structure and connecting the latter with the recited journal means.

3. A vehicle as defined in claim 2 in which the defined link means in effect extends, from its hinge axis on the structure to the journal means on the roller, obliquely downward in the direction of travel.

4. A vehicle as defined in claim 1 in which the means last defined therein comprises manually actuated means having connection to the journal means of the roller.

5. A vehicle as defined in claim 1 in which the means last defined therein comprises manually actuated, mechanical-advantage means having connection to the journal means of the roller.

6. A vehicle comprising a flexible-walled, fluid-distensible roller for supporting a load applied to its outer surface and having, when distended and free of load, a symmetrically crowned shape such that it is adapted to be load-flattened against the ground throughout a part of the surface of the roller that is at least substantially as extensive axially as circumferentially of the roller, and a load-sustaining structure and revolvable means journaled thereon and running upon the outer surface of said roller for applying substantially the entire weight of a transportation load to said roller, and means associated with said structure for maintaining fore-and-aft alignment of said journaled means and said crowned roller, the said journaled means comprising roller-contacting elements in succession along an axis of the said journaled means that is parallel to the axis of the said roller, and of axially graduated peripheral speeds corresponding substantially to the axially graduated peripheral speeds of the respective parts of the crowned roller upon which they run.

7. A vehicle as defined in claim 6 in which the defined elements are geometric elements of a crowned load-applying roller extending, lengthwise of the fluid-distensible roller, substantially across the load-sustaining zone of the fluid-distensible roller.

8. A vehicle comprising a flexible-walled, fluid-distensible roller for supporting a load applied to its outer surface and having, when distended and free of load, a symmetrically crowned shape such that it is adapted to be load-flattened against the ground throughout a part of the surface of the roller that is at least substantially as extensive axially as circumferentially of the roller, a load-sustaining structure and revolvable means journaled thereon and running upon the outer surface of said roller for applying the force of a load to said roller, and means having reaction against said structure for forcibly tilting the axis of rotation of said roller in relation to and transversely of the vehicle and thus causing the center of gravity force of the load against said roller to shift in a direction lengthwise of the axis of the roller, whereby the crowned roller is given the directional characteristic of a conical roller.

9. A vehicle as defined in claim 8 in which the last recited means comprises a vehicle frame, means whereby the defined load-sustaining structure is pivoted to said frame on an axis which lies substantially in a vertical, fore-and-aft plane of said frame but is inclined in relation to the direction of travel, so that the turning of said structure on said axis as a steering factor also lowers the end of the roller's axis that is at the inner side of the roller's steered course and raises the other end of the roller's axis, in relation to the frame.

10. A vehicle comprising a flexible-walled, fluid distensible roller for supporting a load applied to its outer surface, said roller being so crowned that it is adapted to be load-flattened against the ground throughout a part of the surface of the roller that is at least substantially as extensive axially as circumferentially of the roller, a load-sustaining structure and revolvable means journaled thereon and running upon the outer surface of said roller for applying the force of a load to said roller, a propulsion yoke hinged on said structure, as substantially the only connection of the yoke to said structure, with its arms extending to the ends of the said roller, and means journaling the roller to said arms, the yoke thus being adapted to compel the said roller and the said structure to progress at substantially the same ground speed but not to serve primarily as a load-supporting element, an arm of the yoke being provided with a surface that is of sled runner shape in the vicinity of the journal means, for transmitting ground forces to the said journal means but substantially without load-sustaining connection of said surface to the defined load-sustaining structure except through the defined roller.

11. A vehicle comprising a flexible-walled, fluid-distensible roller, horizontal-propulsion means journaled to the respective ends of the said roller for applying horizontal propulsive force in the line of travel to said roller through its journaled connection thereto, and guard means associated with said horizontal-propulsion means in the vicinity of the respective ends of the roller, said roller being rotatable in relation to said guard means.

12. A vehicle comprising a flexible-walled, fluid-distensible roller, horizontal-propulsion means journaled to the respective ends of the said roller for applying horizontal propulsive force in the line of travel to said roller through its journaled connection thereto, and, in the vicinity of each end of the roller, a wheel journaled in relation to the horizontal-propulsion means.

13. A vehicle comprising a flexible-walled, fluid-distensible roller, horizontal-propulsion means journaled to the respective ends of the said roller for applying horizontal propulsive force in the line of travel to said roller through its journaled connection thereto, and, in the vicinity of each end of the roller, a wheel journaled in relation to the horizontal-propulsion means and in relation to the roller.

14. A vehicle comprising a flexible-walled, fluid-distensible, ground-contacting roller for supporting a load applied to its outer surface, said roller being so crowned that it is adapted to be load-flattened against the ground throughout a part of the surface of the roller that is at least substantially as extensive axially as circumferentially of the roller, a load-sustaining structure in journaled relation to said roller, revolvable means journaled on said structure and running upon the outer surface of said roller for applying the force of the load to the roller, and means for holding said roller and said revolvable means with their axes in substantially symmetrical relationship while permitting the axis of the ground-contacting roller to move toward and from the said revolvable means in operation.

15. A vehicle comprising a flexible-walled, fluid-distensible, ground-contacting roller for supporting a load, said roller being so crowned that it is adapted to be load-flattened against the ground throughout a part of the surface of the roller that is at least substantially as extensive axially as circumferentially of the roller, a load-sustaining structure, journal means whereby said load-sustaining structure is mounted on said roller, means for maintaining said roller's axis in substantially symmetrical relation to said load-sustaining structure while permitting said axis to move toward and from said structure, and power means for applying torque to said roller for propelling said vehicle.

16. A vehicle comprising a flexible-walled, fluid-distensible, ground-contacting roller of symmetrically crowned shape such that it is adapted to be load-flattened against the ground throughout a part of the surface of the roller that is at least substantially as extensive axially as circumferentially of the roller, a load-sustaining structure for applying the force of the load to said roller, means for maintaining symmetrical relation of the axis of said roller to said structure while permitting said axis to move toward and from said structure, a vehicle frame by which the force of the load is applied to said structure, and means for tilting said structure laterally of the vehicle frame to shift, lengthwise of the axis of the ground-contacting roller, the vertical center line of the gravity force of the load, whereby the crowned roller is given the steering characteristic of a conical roller.

17. A vehicle as defined in claim 16 in which the load-sustaining structure is pivoted to the vehicle frame on an axis which lies in a vertical fore-and-aft plane of said frame but is inclined in relation to the direction of travel, so that the turning of said structure upon said axis as a steering factor also lowers the end of the roller's axis that is at the inner side of the roller's steered course and raises the other end of the roller's axis in relation to said frame, whereby the crowned roller is given the steering characteristic of a conical roller.

18. A vehicle comprising a flexible-walled, fluid-distensible, ground-contacting roller of crowned shape such that it is adapted to be load-flattened against the ground throughout a part of the surface of the roller that is at least substantially as extensive axially as circumferentially of the roller, a vehicle frame, journal means whereby said frame is mounted on said roller, and means for tilting the axis of said journal means laterally of the vehicle frame, whereby said crowned roller is given the steering characteristic of a conical roller.

19. A flexible-walled, fluid-distensible, ground-contacting roller of such crowned shape that it is adapted to be load-flattened against the ground throughout a part of the surface of the roller that is at least substantially as extensive axially as circumferentially of the roller, the middle part of its ground-contacting surface being provided with means for providing dominatingly strong resistance to ground slippage, and parts of its ground-contacting surface nearer to its ends having provision for relatively weak resistance to such slippage per unit of area.

20. A roller as defined in claim 19 in combination with means for applying a propelling force to said roller.

21. A vehicle comprising a flexible-walled, fluid-distensible roller of a shape such that it is adapted to be load-flattened against the ground throughout a part of the surface of the roller that is at least substantially as extensive axially as circumferentially of the roller, horizontal-propulsion means journaled to the respective ends of the said roller, and ground-contacting means additional to said roller but having connection to it for limiting, by contact with the ground, tilting of the roller's axis laterally of the line of travel.

22. A vehicle comprising a flexible-walled, fluid-distensible, ground contacting roller of a shape such that it is adapted to be load-flattened against the ground throughout a part of the surface of the roller that is at least substantially as extensive axially as circumferentially of the roller, a load-sustaining structure for applying the force of the load to said roller, and ground-contacting means additional to said roller for limiting tilting of said load-sustaining structure laterally of the line of travel.

References Cited in the file of this patent

UNITED STATES PATENTS

| | | |
|---|---|---|
| 1,394,328 | Miller | Oct. 18, 1921 |
| 1,701,212 | Nickerson | Feb. 5, 1929 |
| 1,897,944 | Carter | Feb. 14, 1933 |
| 2,541,928 | Loomis | Feb. 13, 1951 |
| 2,714,011 | Albee | July 26, 1955 |